United States Patent
Gao et al.

(10) Patent No.: US 11,997,680 B2
(45) Date of Patent: May 28, 2024

(54) TRANSMISSION METHOD, TERMINAL, AND BASE STATION

(71) Applicant: China Academy of Telecommunications Technology, Beijing (CN)

(72) Inventors: Xuejuan Gao, Beijing (CN); Ekpenyong Tony, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 448 days.

(21) Appl. No.: 16/961,685

(22) PCT Filed: Dec. 18, 2018

(86) PCT No.: PCT/CN2018/121853
§ 371 (c)(1),
(2) Date: Jul. 12, 2020

(87) PCT Pub. No.: WO2019/137165
PCT Pub. Date: Jul. 18, 2019

(65) Prior Publication Data
US 2021/0084643 A1 Mar. 18, 2021

(30) Foreign Application Priority Data
Jan. 12, 2018 (CN) .......................... 201810032483.1

(51) Int. Cl.
*H04W 72/21* (2023.01)
*H04W 72/0446* (2023.01)
(52) U.S. Cl.
CPC ....... *H04W 72/21* (2023.01); *H04W 72/0446* (2013.01)

(58) Field of Classification Search
CPC ... H04L 5/0053; H04L 5/0055; H04L 5/0057; H04W 72/0413; H04W 72/0446
See application file for complete search history.

(56) References Cited

U.S. PATENT DOCUMENTS

| 5,329,526 A | 7/1994 | Murata et al. |
| 2017/0006601 A1 | 1/2017 | Seo et al. |
| 2020/0280427 A1* | 9/2020 | Liu ................... H04L 5/001 |

FOREIGN PATENT DOCUMENTS

| CN | 102077499 A | 5/2011 |
| CN | 102820953 A | 12/2012 |

(Continued)

OTHER PUBLICATIONS

Huawei et al.,"Short PUCCH for UCI of up to 2 bits", 3GPP TSG RAN WG1 Meeting AH_NR#3, Nagoya, Japan, Sep. 18-21, 2017, total 17 pages, R1-1715399.

(Continued)

*Primary Examiner* — Bo Hui A Zhu
(74) *Attorney, Agent, or Firm* — Kilpatrick Townsend & Stockton LLP

(57) ABSTRACT

Disclosed are a transmission method, a terminal, and a base station, for a base station cannot perform accurate uplink scheduling for a scheduling request (SR) of a terminal due to that there is no explicit solution for how to distinguish which SR in a plurality of SR configuration is transmitted simultaneously with other UCIs. In the transmission method for distinguishing a plurality of SR configurations provided by embodiments of the present disclosure, the terminal cascades an M-bit SR with a first UCI and simultaneously transmits same, and M-bit SR information is used for indicating SR states of the plurality of SR configurations of the terminal, ensuring that a base station performs correct uplink scheduling on the terminal.

20 Claims, 3 Drawing Sheets

Determining, by a terminal, scheduling request (SR) information with M bits, wherein the M is an integer greater than 1 — S101

Sending, by the terminal, the SR information with M bits and first uplink control information (UCI) to a base station — S102

(56) References Cited

FOREIGN PATENT DOCUMENTS

| CN | 103828319 | A  | 5/2014  |
|----|-----------|----|---------|
| CN | 104170493 | A  | 11/2014 |
| CN | 106954277 | A  | 7/2017  |
| CN | 107005374 | A  | 8/2017  |
| CN | 109067512 | A  | 12/2018 |
| WO | 2013067677 | A1 | 5/2013 |
| WO | 2017048215 | A1 | 3/2017 |

OTHER PUBLICATIONS

Nokia et al.,"Remaining details of short PUCCH for UCI up to 2 bits", 3GPP TSG RAN WG1 Meeting 91, Reno, USA, Nov. 27-Dec. 1, 2017, total 6 pages, R1-1720007.

Samsung,"Remaining Issues for Short PUCCH with UCI of more than 2 Bits", 3GPP TSG RAN WG1 Meeting 91, Reno, USA, Nov. 27-Dec. 1, 2017, total 5 pages, R1-1720327.

InterDigital Inc."On HARQ-ACK and SR multiplexing on Short-PUCCH", 3GPP TSG RAN WG1 Meeting 91, Reno, USA, Nov. 27-Dec. 1, 2017, total 6 pages, R1-1720638.

Samsung,"Resource allocation for PUCCH with SR", 3GPP TSG RAN WG1 Meeting #89, Hangzhou, China, May 15-19, 2017, total 4 pages, R1-1708011.

Ericsson,"On the Design of Long PUCCH for more than 2 bits", 3GPP TSG RAN WG1 Meeting#90bis, Prague, Czech Republic, Oct. 9-13, 2017, total 19 pages, R1-1718800.

\* cited by examiner

TRANSMISSION METHOD, TERMINAL, AND BASE STATION

The application is National Stage of International Application No. PCT/CN2018/121853, filed Dec. 18, 2018, which claims the priority of Chinese Patent Application No. 201810032483.1, filed with China National Intellectual Property Administration on Jan. 12, 2018, and entitled "TRANSMISSION METHOD, TERMINAL, AND BASE STATION", both of which are hereby incorporated by reference in their entireties.

FIELD

The present disclosure relates to the field of communication technology, in particular to a transmission method, a terminal, and a base station.

BACKGROUND

With the development and change in requirements for mobile communication services, many organizations such as International Telecommunication Union (ITU) have begun to study new wireless communication systems (5 Generation New RAT, 5G NR) for future mobile communication systems.

In a 5G NR system, a terminal may have a plurality of scheduling request (SR) configurations, and each SR configuration has unique parameters, such as SR resource and period. When the plurality of SR configurations overlap at the same time, a media access control (MAC) layer of the terminal may only inform the terminal that one of the SR configurations is transmitted at a physical layer, i.e. a positive SR is transmitted. When SRs are transmitted simultaneously with other uplink control information (UCI), there is no explicit solution for how to distinguish which SR of the plurality of SR configurations is transmitted simultaneously with the other UCI, thus making a base station unable to perform accurate uplink scheduling for the SRs of the terminal.

SUMMARY

The embodiments of the present disclosure provide a transmission method, a terminal and a base station, for use in resolving the issues in the prior art that a base station cannot perform accurate uplink scheduling for a scheduling request (SR) of a terminal due to that there is no explicit solution for how to distinguish which SR in a plurality of SR configurations is transmitted simultaneously with other UCI.

In a first aspect, an embodiment of the present disclosure provides a transmission method, including:
determining, by a terminal, SR information with M bits, wherein the M is an integer greater than 1; and
sending, by the terminal, the SR information with M bits and first UCI to a base station simultaneously.

In one possible implementation, the SR information with M bits corresponds to a plurality of SR configurations, one bit of the M bits corresponds to one SR configuration of the plurality of SR configurations, and a value of the one bit indicates that the one SR configuration is in a positive SR state or a negative SR state.

In one possible implementation, the M is a maximum quantity of a plurality of SR configurations supported in system configured for the terminal; or the M is a quantity of the plurality of SR configurations configured for the terminal; or the M is a quantity of SR configurations with overlapping transmission occasions within the plurality of SR configurations configured for the terminal; or a value of the M is notified to the terminal by a network side through configuration signaling.

In one possible implementation, and the SR information with M bits corresponding to a plurality of SR configurations includes:
the SR information with M bits corresponds to the plurality of SR configurations based on a preset order of the plurality of SR configurations; or the SR information with M bits corresponds to the plurality of SR configurations based on a corresponding relationship notified by a network layer.

In one possible implementation, only one bit of the M bits indicates the positive SR state.

In one possible implementation, a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, and one bit state of the A bit states indicates that one SR configuration of the A SR configurations is in a positive SR state, and the first bit state is any one of the plurality of bit states.

In one possible implementation, the plurality of bit states further include reserved states in the condition that a quantity of states of the plurality of bit states is greater than or is equal to a quantity of the plurality of SR configurations plus 1.

In one possible implementation, and:
the M is determined according to a maximum quantity A1 of a plurality of SR configurations supported in system configured for the terminal; or
the M is determined according to a quantity A2 of the plurality of SR configurations configured for the terminal; or
the M is determined according to a quantity A3 of SR configurations with overlapping transmission occasions within the plurality of SR configurations configured for the terminal; or the M is determined by a value of the M notified by a network side to the terminal through configuration signaling.

In one possible implementation, and the M is determined through a formula: M=ceil ($\log_2$(Ai+1)); and ceil means rounding up and Ai is A1 or A2 or A3.

In one possible implementation, sending, by the terminal, the SR information with M bits and the first UCI to the base station simultaneously includes:
cascading, by the terminal, the SR information with M bits and the first UCI;
performing, by the terminal, channel coding on cascaded SR information with M bits and first UCI; and
sending, by the terminal, channel coded SR information with M bits and first UCI to the base station.

In one possible implementation, the first UCI includes at least one of hybrid automatic repeat request-acknowledgement (HARQ-ACK) or channel state information (CSI).

In one possible implementation, the CSI includes at least one of periodic CSI, aperiodic CSI, or semi-persistent scheduling CSI.

In one possible implementation, sending, by the terminal, the SR information with M bits and the first UCI to the base station simultaneously includes:
cascading, by the terminal, the SR information with M bits and a first part of CSI;
performing, by the terminal, channel coding on cascaded SR information with M bits and first part of CSI, and a second part of CSI respectively; and sending, by the terminal, channel coded information to the base station;

and the first UCI includes the CSI and the CSI consists of the first part of CSI and the second part of CSI.

In one possible implementation, sending, by the terminal, the SR information with M bits and the first UCI to the base station simultaneously includes:

sending, by the terminal, the SR information with M bits and the first UCI to the base station simultaneously on a transmission resource of a first physical uplink control channel (PUCCH) format;

and the first PUCCH format is PUCCH format 2 or PUCCH format 3 or PUCCH format 4 or a PUCCH format for carrying more than 2 bits of the first UCI.

In one possible implementation, the method further includes:

determining, by the terminal, whether a preset condition is satisfied; and determining, by the terminal, the SR information with M bits in response to that the preset condition is satisfied.

In one possible implementation, the preset condition is that:

a current transmission time is an SR transmission occasion; or the current transmission time is an SR transmission occasion, and a plurality of SR configurations are in the SR transmission occasion.

In a second aspect, an embodiment of the present disclosure provides a transmission method, including:

receiving, by a base station, an information sequence sent by a terminal on a transmission resource of a first PUCCH format, and the information sequence includes SR information with M bits with M bits and first UCI, and the M is an integer greater than 1; and obtaining, by the base station, the SR information with M bits based on the information sequence; and determining, by the base station, SR states of a plurality of SR configurations configured for the terminal according to the SR information with M bits.

In one possible implementation, the SR information with M bits corresponds to a plurality of SR configurations, one bit of the M bits corresponds to one SR configuration of the plurality of SR configurations, and a value of the one bit indicates that the one SR configuration is in a positive SR state or a negative SR state.

In one possible implementation, the M is a maximum quantity of a plurality of SR configurations supported in system configured for the terminal; or the M is a quantity of the plurality of SR configurations configured for the terminal; or the M is a quantity of SR configurations with overlapping transmission occasions within the plurality of SR configurations configured for the terminal; or a value of the M is notified to the terminal by a network side through configuration signaling.

In one possible implementation, the SR information with M bits corresponding to a plurality of SR configurations includes:

the SR information with M bits corresponds to the plurality of SR configurations based on a preset order of the plurality of SR configurations; or the SR information with M bits corresponds to the plurality of SR configurations based on a corresponding relationship notified by a network layer.

In one possible implementation, only one bit of the M bits indicates the positive SR state.

In one possible implementation, a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, and one bit state of the A bit states indicates that one SR configuration of the A SR configurations is in a positive SR state, and the first bit state is any one of the plurality of bit states.

In one possible implementation, the plurality of bit states further include reserved states in the condition that a quantity of states of the plurality of bit states is greater than or is equal to a quantity of the plurality of SR configurations plus 1.

In one possible implementation, the M is determined according to a maximum quantity A1 of a plurality of SR configurations supported in system configured for the terminal; or the M is determined according to a quantity A2 of the plurality of SR configurations configured for the terminal; or the M is determined according to a quantity A3 of SR configurations with overlapping transmission occasions within the plurality of SR configurations configured for the terminal; or a value of the M is notified to the terminal by a network side through configuration signaling.

In one possible implementation, the M is determined through a formula: $M=\text{ceil}(\log_2(A_i+1))$; and ceil means rounding up and $A_i$ is A1 or A2 or A3.

In one possible implementation, the first UCI includes at least one of hybrid automatic repeat request-acknowledgement (HARQ-ACK) or channel state information (CSI).

In one possible implementation, the CSI includes at least one of periodic CSI, aperiodic CSI, or semi-persistent scheduling CSI.

In one possible implementation, the method further includes:

determining, by the base station, that the SR information with M bits and a first part of CSI are cascaded; and performing, by the base station, channel decoding on cascaded SR information with M bits and first part of CSI, and a second part of CSI respectively;

and the first UCI includes the CSI and the CSI consists of the first part of CSI and the second part of CSI.

In one possible implementation, the first PUCCH format is PUCCH format 2 or PUCCH format 3 or PUCCH format 4 or a PUCCH format for carrying more than 2 bits of the first UCI.

In a third aspect, an embodiment of the present disclosure provides a terminal, including:

a memory, configured to store instructions;

a processor, configured to read the instructions in the memory to determine SR information with M bits, and the M is an integer greater than 1; and a transceiver, configured to send the SR information with M bits and first UCI to a base station simultaneously.

In one possible implementation, the SR information with M bits corresponds to a plurality of SR configurations, one bit of the M bits corresponds to one SR configuration of the plurality of SR configurations, and a value of the one bit indicates that the one SR configuration is in a positive SR state or a negative SR state.

In one possible implementation, the M is a maximum quantity of a plurality of SR configurations supported in system configured for the terminal; or the M is a quantity of the plurality of SR configurations configured for the terminal; or the M is a quantity of SR configurations with overlapping transmission occasions within the plurality of SR configurations configured for the terminal; or a value of the M is notified to the terminal by a network side through configuration signaling.

In one possible implementation, and the SR information with M bits corresponding to a plurality of SR configurations includes:

the SR information with M bits corresponds to the plurality of SR configurations based on a preset order of the plurality of SR configurations; or the SR information with M bits corresponds to the plurality of SR configurations based on a corresponding relationship notified by a network layer.

In one possible implementation, only one bit of the M bits indicates the positive SR state.

In one possible implementation, a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, and one bit state of the A bit states indicates that one SR configuration of the A SR configurations is in a positive SR state, and the first bit state is any one of the plurality of bit states.

In one possible implementation, the plurality of bit states further include reserved states in the condition that a quantity of states of the plurality of bit states is greater than or is equal to a quantity of the plurality of SR configurations plus 1.

In one possible implementation, and:

the M is determined according to a maximum quantity A1 of a plurality of SR configurations supported in system configured for the terminal; or the M is determined according to a quantity A2 of the plurality of SR configurations configured for the terminal; or the M is determined according to a quantity A3 of SR configurations with overlapping transmission occasions within the plurality of SR configurations configured for the terminal; or the M is determined by a value of the M notified by a network side to the terminal through configuration signaling.

In one possible implementation, the M is determined through a formula: $M=\text{ceil}(\log_2(Ai+1))$; and ceil means rounding up and Ai is A1 or A2 or A3.

In one possible implementation, the transceiver is further configured to:

cascade the SR information with M bits and the first UCI;

perform channel coding on cascaded SR information with M bits and first UCI; and send channel coded SR information with M bits and first UCI to the base station.

In one possible implementation, the first UCI includes at least one of hybrid automatic repeat request-acknowledgement (HARQ-ACK) or channel state information (CSI).

In one possible implementation, the CSI includes at least one of periodic CSI, aperiodic CSI, or semi-persistent scheduling CSI.

In one possible implementation, the transceiver is further configured to:

cascade the SR information with M bits and a first part of CSI;

perform channel coding on cascaded SR information with M bits and first part of CSI, and a second part of CSI respectively; and send channel coded information to the base station;

and the first UCI includes the CSI and the CSI consists of the first part of CSI and the second part of CSI.

In one possible implementation, the transceiver is further configured to:

send the SR information with M bits and the first UCI to the base station simultaneously on a transmission resource of a first PUCCH format;

and the first PUCCH format is PUCCH format 2 or PUCCH format 3 or PUCCH format 4 or a PUCCH format for carrying more than 2 bits of the first UCI.

In one possible implementation, the processor is further configured to:

determine whether a preset condition is satisfied; and determine the SR information with M bits in response to that the preset condition is satisfied.

In one possible implementation, the preset condition is that:

a current transmission time is an SR transmission occasion; or the current transmission time is an SR transmission occasion, and a plurality of SR configurations are in the SR transmission occasion.

In a fourth aspect, an embodiment of the present disclosure provides a base station, including:

a memory, configured to store instructions; and a processor, configured to read the instructions in the memory to:

receive an information sequence sent by a terminal on a transmission resource of a first PUCCH format through a transceiver, and the information sequence includes SR information with M bits and first UCI, and the M is an integer greater than 1; and obtain the SR information with M bits based on the information sequence; and determine SR states of a plurality of SR configurations configured for the terminal according to the SR information with M bits.

In one possible implementation, the SR information with M bits corresponds to a plurality of SR configurations, one bit of the M bits corresponds to one SR configuration of the plurality of SR configurations, and a value of the one bit indicates that the one SR configuration is in a positive SR state or a negative SR state.

In one possible implementation, the M is a maximum quantity of a plurality of SR configurations supported in system configured for the terminal; or the M is a quantity of the plurality of SR configurations configured for the terminal; or the M is a quantity of SR configurations with overlapping transmission occasions within the plurality of SR configurations configured for the terminal; or a value of the M is notified to the terminal by a network side through configuration signaling.

In one possible implementation, the SR information with M bits corresponds to the plurality of SR configurations based on a preset order of the plurality of SR configurations; or the SR information with M bits corresponds to the plurality of SR configurations based on a corresponding relationship notified by a network layer.

In one possible implementation, only one bit of the M bits indicates the positive SR state.

In one possible implementation, a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, and one bit state of the A bit states indicates that one SR configuration of the A SR configurations is in a positive SR state, and the first bit state is any one of the plurality of bit states.

In one possible implementation, the plurality of bit states further include reserved states in the condition that a quantity of states of the plurality of bit states is greater than or is equal to a quantity of the plurality of SR configurations plus 1.

In one possible implementation, the M is determined according to a maximum quantity A1 of a plurality of SR configurations supported in system configured for the terminal; or the M is determined according to a quantity A2 of the plurality of SR configurations configured for the terminal; or the M is determined according to a quantity A3 of SR configurations with overlapping transmission occasions within the plurality of SR configurations configured for the terminal; or a value of the M is notified to the terminal by a network side through configuration signaling.

In one possible implementation, the M is determined through a formula: $M=\text{ceil}(\log_2(A_i+1))$; and ceil means rounding up and Ai is A1 or A2 or A3.

In one possible implementation, the first UCI includes at least one of hybrid automatic repeat request-acknowledgement (HARQ-ACK) or channel state information (CSI).

In one possible implementation, the CSI includes at least one of periodic CSI, aperiodic CSI, or semi-persistent scheduling CSI.

In one possible implementation, the processor is further configured to:
determine that the SR information with M bits and the first part of CSI are cascaded; and
perform channel decoding on cascaded SR information with M bits and first part of CSI, and a second part of CSI respectively;
and the first UCI includes the CSI and the CSI consists of the first part of CSI and the second part of CSI.

In one possible implementation, the first PUCCH format is PUCCH format 2 or PUCCH format 3 or PUCCH format 4 or a PUCCH format for carrying more than 2 bits of the first UCI.

In a fifth aspect, an embodiment of the present disclosure provides a terminal, including:
a determining device, configured to determine SR information with M bits, and M is an integer greater than 1; and
a sending device, configured to send the SR information with M bits and first UCI to a base station simultaneously.

In one possible implementation, the SR information with M bits corresponds to a plurality of SR configurations, one bit of the M bits corresponds to one SR configuration of the plurality of SR configurations, and a value of the one bit indicates that the one SR configuration is in a positive SR state or a negative SR state.

In one possible implementation, the M is a maximum quantity of a plurality of SR configurations supported in system configured for the terminal; or the M is a quantity of the plurality of SR configurations configured for the terminal; or the M is a quantity of SR configurations with overlapping transmission occasions within the plurality of SR configurations configured for the terminal; or a value of the M is notified to the terminal by a network side through configuration signaling.

In one possible implementation, the SR information with M bits corresponds to the plurality of SR configurations based on a preset order of the plurality of SR configurations; or the SR information with M bits corresponds to the plurality of SR configurations based on a corresponding relationship notified by a network layer.

In one possible implementation, only one bit of the M bits indicates the positive SR state.

In one possible implementation, a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, and one bit state of the A bit states indicates that one SR configuration of the A SR configurations is in a positive SR state, and the first bit state is any one of the plurality of bit states.

In one possible implementation, the plurality of bit states further include reserved states in the condition that a quantity of states of the plurality of bit states is greater than or is equal to a quantity of the plurality of SR configurations plus 1.

In one possible implementation, the M is determined according to a maximum quantity A1 of a plurality of SR configurations supported in system configured for the terminal; or the M is determined according to a quantity A2 of the plurality of SR configurations configured for the terminal; or the M is determined according to a quantity A3 of SR configurations with overlapping transmission occasions within the plurality of SR configurations configured for the terminal; or a value of the M is notified to the terminal by a network side through configuration signaling.

In one possible implementation, the M is determined through a formula: $M=\text{ceil}(\log_2(A_i+1))$; and ceil means rounding up and Ai is A1 or A2 or A3.

In one possible implementation, the sending device is configured to:
Cascade the SR information with M bits and the first UCI;
perform channel coding on cascaded SR information with M bits and first UCI; and
send channel coded SR information with M bits and first UCI to the base station.

In one possible implementation, the first UCI includes at least one of hybrid automatic repeat request-acknowledgement (HARQ-ACK) or channel state information (CSI).

In one possible implementation, the CSI includes at least one of periodic CSI, aperiodic CSI, or semi-persistent scheduling CSI.

In one possible implementation, the sending device is configured to:
cascade the SR information with M bits and a first part of CSI;
perform channel coding on cascaded SR information with M bits and first part of CSI, and a second part of CSI respectively; and
send channel coded information to the base station;
and the first UCI includes the CSI and the CSI consists of the first part of CSI and the second part of CSI.

In one possible implementation, the sending device is configured to:
send the SR information with M bits and the first UCI to the base station simultaneously on a transmission resource of a first PUCCH format;
and the first PUCCH format is PUCCH format 2 or PUCCH format 3 or PUCCH format 4 or a PUCCH format for carrying more than 2 bits of the first UCI.

In one possible implementation, the determining device is configured to:
determine whether a preset condition is satisfied; and
determine the SR information with M bits in response to that the preset condition is satisfied.

In one possible implementation, the preset condition is that:

a current transmission time is an SR transmission occasion; or the current transmission time is an SR transmission occasion, and a plurality of SR configurations are in the SR transmission occasion.

In a sixth aspect, an embodiment of the present disclosure provides a base station, including:

a receiving device, configured to receive an information sequence sent by a terminal on a transmission resource of a first PUCCH format, and the information sequence includes SR information with M bits and first UCI, and the M is an integer greater than 1; and a determining device, configured to obtain the SR information with M bits based on the information sequence, and determine SR states of a plurality of SR configurations configured for the terminal according to the SR information with M bits.

In one possible implementation, the SR information with M bits corresponds to a plurality of SR configurations, one bit of the M bits corresponds to one SR configuration of the plurality of SR configurations, and a value of the one bit indicates that the one SR configuration is in a positive SR state or a negative SR state.

In one possible implementation, the M is a maximum quantity of a plurality of SR configurations supported in system configured for the terminal; or the M is a quantity of the plurality of SR configurations configured for the terminal; or the M is a quantity of SR configurations with overlapping transmission opportunities SR configurations configured for the terminal; or a value of the M is notified to the terminal by a network side through configuration signaling.

In one possible implementation, the SR information with M bits corresponds to the plurality of SR configurations based on a preset order of the plurality of SR configurations; or the SR information with M bits corresponds to the plurality of SR configurations based on a corresponding relationship notified by a network layer.

In one possible implementation, only one bit of the M bits indicates the positive SR state.

In one possible implementation, a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, and one bit state of the A bit states indicates that one SR configuration of the A SR configurations is in a positive SR state, and the first bit state is any one of the plurality of bit states.

In one possible implementation, the plurality of bit states further include reserved states in the condition that a quantity of states of the plurality of bit states is greater than or is equal to a quantity of the plurality of SR configurations plus 1.

In one possible implementation, the M is determined according to a maximum quantity A1 of a plurality of SR configurations supported in system configured for the terminal; or the M is determined according to a quantity A2 of the plurality of SR configurations configured for the terminal; or the M is determined according to a quantity A3 of SR configurations with overlapping transmission occasions within the plurality of SR configurations configured for the terminal; or a value of the M is notified to the terminal by a network side through configuration signaling.

In one possible implementation, the M is determined through a formula: $M=\text{ceil}(\log_2(Ai+1))$; and ceil means rounding up and Ai is A1 or A2 or A3.

In one possible implementation, the first UCI includes at least one of hybrid automatic repeat request-acknowledgement (HARQ-ACK) or channel state information (CSI).

In one possible implementation, the CSI includes at least one of periodic CSI, aperiodic CSI, or semi-persistent scheduling CSI.

In one possible implementation, the determining device is configured to:

determine that the SR information with M bits and a first part of CSI are cascaded; and perform channel decoding on cascaded SR information with M bits and first part of CSI, and a second part of CSI respectively;

and the first UCI includes the CSI and the CSI consists of the first part of CSI and the second part of CSI.

In one possible implementation, the first PUCCH format is PUCCH format 2 or PUCCH format 3 or PUCCH format 4 or a PUCCH format for carrying more than 2 bits of the first UCI.

In a seventh aspect, an embodiment of the present disclosure provides a computer readable storage medium that stores computer instructions which is executed on a computer to cause the computer to execute the method as described in the first aspect or the second aspect.

In the transmission method for distinguishing the plurality of SR configurations provided by embodiments of the present disclosure, the terminal cascades an M-bit SR with the first UCI and simultaneously transmits same, and the SR information with M bits is configured for indicating the SR states of the plurality of SR configurations of the terminal, ensuring that the base station performs correct uplink scheduling on the terminal.

BRIEF DESCRIPTION OF THE DRAWINGS

The embodiments of the present disclosure are briefly introduce by the drawings.

DETAILED DESCRIPTION OF THE EMBODIMENTS

Figure 1:
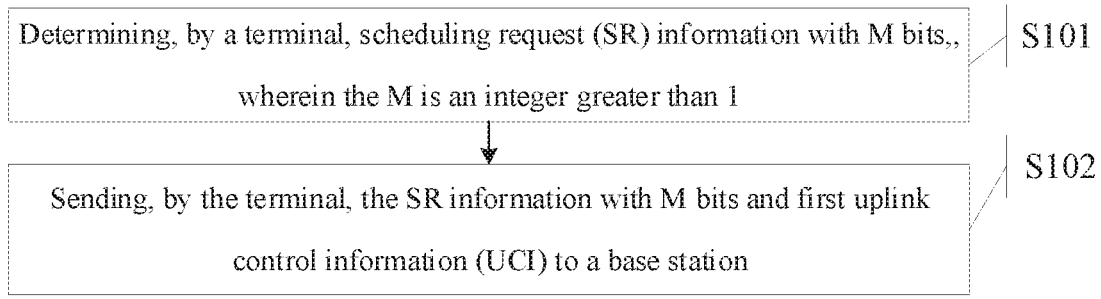
FIG. 1 is a flow chart of a transmission method provided by the embodiments of the present disclosure.

Embodiments of the present disclosure will be described clearly and completely below with reference to the drawings in the embodiments of the present disclosure.

Embodiments of the present disclosure can be applied to various communication systems, such as a global system of mobile communication (GSM), a code division multiple access (CDMA) system, a wideband code division multiple access (WCDMA) system, a general packet radio service (GPRS), a long term evolution (LTE) system, an advanced long term evolution (LTE-A) system, a universal mobile telecommunication system (UMTS), and a new radio (NR).

It should also be understood that in the embodiments of the present disclosure, user equipment (UE) includes, but is not limited to, a mobile station (MS), a mobile terminal, a mobile telephone, a handset, portable equipment, etc. The user equipment can communicate with one or more core networks via a radio access network (RAN). For example, the user equipment can be the mobile telephone (also called "cellular" telephone), a computer with wireless communication function, etc. The user equipment can also be a portable, pocket-sized, handheld, computer-built or vehicle-mounted mobile device.

In the embodiments of the present disclosure, a base station (e.g., access point) may refer to a device in an access network that communicates with a wireless terminal over one or more sectors on an air interface. The base station can be configured to convert received air frames and IP packets to each other as routers between the wireless terminal and the rest of the access network, and the rest of the access network may include an internet protocol (IP) network. The base station may also coordinate attribute management of the air interface. For example, the base station may be a base transceiver station (BTS) in the GSM or the CDMA, a NodeB in the TD-SCDMA or the WCDMA, an evolutional Node B (eNodeB or eNB or e-NodeB) in the LTE, or a base station (gNB) in 5G NR, which is not limited herein.

The embodiments of the present disclosure are described below with reference to the drawings in the embodiments of the present disclosure.

Five physical uplink control channel (PUCCH) formats are defined in the 5G NR system, namely PUCCH format 0, PUCCH format 1, PUCCH format 2, PUCCH format 3 and PUCCH format 4, and different PUCCH formats have different transmission solutions.

PUCCH is configured to transmit UCI, which may include hybrid automatic repeat request-acknowledgement (HARQ-ACK), channel sate information (CSI), SRs, etc.

PUCCH format 0 or PUCCH format 1 can be configured to support transmission of the UCI no more than 2 bits, and PUCCH format 2 or PUCCH format 3 or PUCCH format 4 can be configured to support transmission of the UCI more than 2 bits. HARQ-ACK can be transmitted through any of the above five PUCCH formats. The CSI can be transmitted through at least PUCCH format 2 or PUCCH format 3 or PUCCH format 4. The SRs can be transmitted through at least PUCCH format 0 or PUCCH format 1.

PUCCH format 2 or PUCCH format 3 or PUCCH format 4 can be configured for transmission by coding and rate matching methods, that is, the UCI to be transmitted is mapped to PUCCH format resources other than a demodulation reference signal (DMRS) on configured PUCCH format resources after channel coded and rate matched.

A plurality of SR configurations can be configured for a terminal in a 5G NR system, and different SR configurations correspond to different service types and/or transmission requirements, and different SR configurations correspond to different SR resources. The transmission opportunities of the plurality of SR configurations may overlap, in which case the plurality of SR configurations exist in one SR transmission occasion, the terminal may only transmit the one SR that needs to be transmitted, therefore, the terminal only transmits the SR on a SR resource corresponding to the SR that needs to be transmitted in the SR transmission occasion. The base station determines which SR is transmitted by the terminal through blind detection on SR resources corresponding to the plurality of SR configurations configured for the terminal, thus performing reasonable uplink scheduling.

When the terminal has the plurality of SR configurations, the transmission opportunities of the plurality of SRs overlap, and only one SR needs to be transmitted in the overlapping SR transmission opportunities. A base station cannot distinguish which SR needs to be transmitted, thus making the base station unable to carry out accurate uplink scheduling for the SRs of the terminal.

In view of this, in the transmission method for distinguishing the plurality of SR configurations provided by embodiments of the present disclosure, the terminal cascades an M-bit SR with first UCI and simultaneously transmits same, and SR information with M bits is configured for indicating SR states of the plurality of SR configurations of the terminal, ensuring that a base station performs correct uplink scheduling on the terminal.

It should be understood that in the description of the embodiments of the present disclosure, the words such as "first" and "second" are used for the objective of distinguishing description only, and cannot be understood as indicating or implying relative importance, or as indicating or implying order. In the description of the embodiments of the present disclosure, "a plurality of" refers to two or more.

The term "and/or" in the embodiments of the present disclosure is only an association relationship describing the associated objects, which means that there can be three kinds of relationships, for example, A and/or B can mean A alone; A and B; and B alone. In addition, the character "/" herein generally indicates that the two associated objects are in an "or" relationship.

Preferred embodiments of the present disclosure will be described in detail below with reference to the accompanying drawings.

Embodiment 1

Referring to FIG. 1, an embodiment of the present disclosure provides a transmission method which can be implemented by a terminal, and the terminal can be a device capable of communicating with a base station, such as a personal computer, a mobile telephone or a tablet computer. The flow of the method is described as follows, and a method on a base station side will also be described.

S101: SR information with M bits is determined by the terminal, and M is an integer greater than 1.

S102: the SR information with M bits and first UCI is sent to the base station simultaneously by the terminal.

In the embodiment of the present disclosure, the base station may configure at least one SR configuration for the terminal, and one or more parameters of a SR configuration are different from that of another SR configuration. After determining which SR configuration is to be sent, the terminal sends an SR corresponding to the SR configuration to the base station. In practical application, transmission opportunities of the plurality of SR configurations may overlap in a time domain, in which case the terminal only sends one of the SR configurations. If the terminal chooses to cascade the SR corresponding to the SR configuration to be sent and the first UCI to be transmitted together for transmission, the terminal may carry the SR information with M bits in the first UCI so that the base station can make a determination based on the SR information with M bits in order to enable the base station to determine which SR configuration the terminal sends.

In S101, the SR information with M bits can be configured to indicate SR states of the plurality of SR configurations of the terminal, and the terminal can determine the SR information with M bits in, but not limited to the following two ways.

Way 1: The SR information with M bits corresponds to the plurality of SR configurations, and one bit of M bits corresponds to one SR configuration, and a value of one bit indicates that the corresponding SR configuration is in a positive SR state or a negative SR state.

That is, each bit of the M bits may correspond to the respective one SR configuration. When information with 1 bit corresponding to one SR configuration is "0", it indicates that the corresponding SR configuration is in the negative SR state; when the information with 1 bit corresponding to one SR configuration is "1", it indicates that the corresponding SR configuration is in the positive SR state. Alternatively, when the information with 1 bit corresponding to one SR configuration is "1", it indicates that the corresponding SR configuration is in the negative SR state; and when the information with 1 bit corresponding to one SR configuration is "0", it indicates that the corresponding SR configuration is in the positive SR state.

For example, when the information with 1 bit corresponding to one SR configuration is "0", it indicates that the corresponding SR configuration is in the negative SR state, and when the information with 1 bit corresponding to one SR configuration is "1", it indicates that the corresponding SR configuration is in the positive SR state. Assuming that M is 3, that is, the terminal determines SR information with 3 bits, each bit of 3 bits can correspond to one SR configuration, therefore, assuming that the terminal has three SR configurations, 3 bits corresponding to the SR information with 3 bits can respectively indicate that the three SR configurations are in the positive SR state or the negative SR state.

For example, "100" can indicate that the first SR configuration of the three SR configurations of the terminal transmits a positive SR, the second SR configuration and the third SR configuration of the three SR configurations do not transmit any SR, that is, the first SR configuration is in the positive SR state, and the second SR configuration and the third SR configuration are both in the negative SR state. Another example, "010" may indicate that the second SR configuration of the three SR configurations of the terminal transmits a positive SR, the first SR configuration and the third SR configuration of the three SR configurations do not transmit any SR, that is, the second SR configuration is in the positive SR state, and the first SR configuration and the third SR configuration are both in the negative SR state.

In one possible implementation, only one bit of the M bits indicates the positive SR state.

In one possible implementation, a value of M may be determined by, but not limited to the following methods.

(1) M is the maximum quantity of a plurality of SR configurations supported in system configured for the terminal.

That is, the actual quantity of the SR configurations that the system configures for the terminals may be less than or is equal to the maximum quantity of the SR configurations supported in system configured for the terminal, and M is the maximum quantity. For example, if the maximum quantity of the SR configurations supported in system configured for the terminal is 5, the actual quantity of the SR configurations that the system configures for the terminal may be 1 or 2 or 3 or 4 or the like. In this case, some bits of the M bits do not correspond to any SR configuration, and these bits may be set to be fixed values agreed with the base station, such as "0" or "1").

For example, if the maximum quantity of the SR configurations configured for the terminal in the 5G NR system is 5, and the actual quantity of the SR configurations configured for the terminal is 4, correspondingly, M is 5. That is, the terminal can determine 5-bit SR information to indicate that each of the 4 SR configurations of the terminal is in the positive SR state or the negative SR state. For example, the first 4 bits correspond to each of the 4 SR configurations, and the last bit is reserved and the value of which is set to be "0". Another example, if the maximum quantity of the SR configurations configured for the terminal in the 5G NR system is 3, and the actual quantity of the SR configurations configured for the terminal is 2, correspondingly, M is 3. That is, the terminal can determine SR information with 3 bits to indicate that each of the 2 SR configurations of the terminal is in the positive SR state or the negative SR state. For example, the first 2 bits correspond to each of the 2 SR configurations, and the last bit is reserved and the value of which is set to be "0", and so on.

(2) M is the quantity of the plurality of SR configurations configured for the terminal.

That is, the value of M can be the actual quantity of the SR configurations configured by the system for the terminal. If the system configures 4 SR configurations for the terminal, the value of M is 4. If the system configures 3 SR configurations for the terminal, the value of M is 3.

(3) M is the quantity of the SR configurations with overlapping transmission occasions within the plurality of SR configurations configured for the terminal.

For example, the system configures 5 SR configurations for the terminal, and according to configuration periods, the transmission opportunities of 3 SR configurations may overlap at a certain point. In this case, the value of M may be 3, each of the 3 bits corresponds to each of the overlapping 3 SR configurations respectively, and no such indication is required for SR configurations not overlapping.

(4) The value of M is notified to the terminal by a network side through configuration signaling.

In one possible implementation, the SR information with M bits corresponds to the plurality of SR configurations, specifically including but not limited to the following cases.

Case 1: The SR information with M bits corresponds to the plurality of SR configurations based on a preset order of the plurality of SR configurations.

In Case 1, the plurality of SR configurations of the terminal may have a predefined order. For example, each of the plurality of SR configurations has a corresponding index, such as "1, 2, 3" and so on, and the terminal can correspond to the first bit, the second bit, . . . , and the last bit of the M bits in ascending or descending order of the indexes of the SR configurations.

Case 2: The SR information with M bits corresponds to the plurality of SR configurations based on a corresponding relationship notified by a network layer.

In Case 2, the corresponding relationship between the SR information with M bits and the plurality of SR configurations can be notified to the terminal by the network side through configuration signaling or other ways. For example, the network side notifies the terminal that the indexes of the SR configurations corresponding to the first bit to the last bit of the M bits respectively, and then the terminal can make the SR information with M bits correspond to the plurality of SR configurations according to the corresponding relationship.

Way 2: A first bit state of a plurality of bit states corresponding to the SR information with M bits indicates that each of the plurality of SR configurations is in the negative SR state, and A bit states of the plurality of bit states other than the first bit state of the plurality of bit states correspond to the SR states of A SR configurations, and one bit state of the A bit states indicates that one SR configuration of the A SR configurations is in the positive SR state, and the first bit state is any one of the plurality of bit states.

The value of A may be less than or is equal to a quantity of the bit states other than the first bit state of the plurality of bit states.

That is, one bit state of the plurality of bit states corresponding to the SR information with M bits can be configured to indicate that each of the plurality of SR configurations is in the negative SR state. Please refer to the case corresponding to a bit state "00" in Table 1 or the case corresponding to a bit state "000" in Table 2. However, the rest of the plurality of bit states corresponding to the SR information with M bits can be configured to indicate that a certain SR configuration of the plurality of SR configurations is in the positive SR state.

For example, when M=2, the corresponding relationship is shown in Table 1; and when M=3, the corresponding relationship is shown in Table 2.

TABLE 1

| SR information with 2 bits | indicated SR feedback state |
| --- | --- |
| 00 | negative SR |
| 01 | first SR configuration is positive SR |
| 10 | second SR configuration is positive SR |
| 11 | third SR configuration is positive SR or reserved |

TABLE 2

| SR information with 3 bits | indicated SR feedback state |
| --- | --- |
| 000 | negative SR |
| 001 | first SR configuration is positive SR |
| 010 | second SR configuration is positive SR |
| 011 | third SR configuration is positive SR |
| 100 | fourth SR configuration is positive SR |
| 101 | fifth SR configuration is positive SR or reserved |
| 110 | sixth SR configuration is positive SR or reserved |
| 111 | seventh SR configuration is positive SR or reserved |

In one possible implementation, in the condition that the quantity of states of the plurality of bit states is greater than or is equal to the quantity of the plurality of SR configurations plus 1, the plurality of bit states further include reserved states. For example, in Table 1, if there are 3 SR configurations, all 4 states are used, and if there are only 2 SR configurations, the last state can be reserved.

In one possible implementation, the value of M can be determined by the terminal by, but not limited to the following modes.

Mode (1), M is determined according to the maximum quantity A1 of the plurality of SR configurations supported in system configured for the terminal.

Mode (2), M is determined according to the quantity A2 of the plurality of SR configurations configured for the terminal.

Mode (3), M is determined according to the quantity A3 of the SR configurations with the overlapping transmission occasions within the plurality of SR configurations configured for the terminal.

Mode (4), the value of M is notified to the terminal by the network side through configuration signaling.

In the first three of the above four modes, M may be determined through the following formula:

$$M = \mathrm{ceil}(\log_2(Ai+1));$$

and ceil is rounded up, Ai can be A1 in mode (1), A2 in mode (2), or A3 in mode (3). Of course, Ai can also be other values in practical application, which is not limited in the embodiments of the present disclosure.

After the terminal determines the SR information with M bits, S102 may be started, that is, the terminal sends the SR information with M bits and the first UCI to the base station simultaneously.

In one possible implementation, the terminal can cascade the SR information with M bits with the first UCI, and after joint coding the cascaded SR information with M bits and first UCI, can send the coded SR information with M bits and first UCI to the base station on a transmission resource of a first PUCCH format.

In one possible implementation, the first UCI may include at least one of hybrid automatic repeat request-acknowledgement (HARQ-ACK) or channel state information (CSI). That is, the SR information with M bits may be cascaded with HARQ-ACK, or the SR information with M bits may be cascaded with the CSI, or the SR information with M bits may be cascaded with HARQ-ACK and the CSI. Of course, in practical application, the SR information with M bits may also be cascaded with other UCI, which is not limited in the embodiments of the present disclosure.

The CSI may include at least one of periodic CSI, aperiodic CSI, and semi-persistent scheduling CSI.

In one possible implementation, if the first UCI includes the CSI and the CSI consists of a first part of CSI and a second part of CSI, the terminal can cascade the SR information with M bits with the first part of CSI, and then the terminal performs channel coding on cascaded SR information with M bits and first part of CSI, and the second part of CSI respectively. That is, the SR information with M bits and the first part of CSI are channel coded independent of the second part of CSI, and then the terminal sends channel coded information to the base station.

Alternatively, the terminal can also cascade the SR information with M bits with the second part of CSI, and then the terminal performs channel coding on cascaded SR information with M bits and second part of CSI, and the first part of CSI respectively. That is, the SR information with M bits and the second part of CSI are channel coded independent of the first part of CSI, and then the terminal sends channel coded information to the base station.

In other words, if the CSI in the first UCI can be divided into the first part of CSI and the second part of CSI, the SR information with M bits can be cascaded with the first part of CSI, and the SR information with M bits can also be cascaded with the second part of CSI. In the above cascade process, if HARQ-ACK also exists, HARQ-ACK can be cascaded with the first part of CSI or the second part of CSI.

In one possible implementation, the terminal can send the SR information with M bits and the first UCI to the base station simultaneously on the transmission resource of the first PUCCH format, and the first PUCCH format is PUCCH format 2 or PUCCH format 3 or PUCCH format 4 or a PUCCH format for carrying more than 2 bits of the first UCI.

In one possible implementation, before determining the SR information with M bits, the terminal may also determine whether a preset condition is satisfied; if so, the terminal determines the SR information with M bits, and the preset condition may be: a current transmission time is an SR transmission occasion; or the current transmission time is an SR transmission occasion, and there are the plurality of SR configurations in the SR transmission occasion. The SR transmission occasion can indicate that SR transmission is performed at a certain transmission time.

For example, before the above method is executed, whether the following condition is satisfied can be further determined, and the above method is executed when the following condition is satisfied.

Operation corresponding to the above step S101 and other steps is executed in any SR transmission occasion, no matter whether or not at least two SR configurations is involved in the SR transmission occasion.

Or, operation corresponding to the above step S101 and other steps is executed only in the SR transmission occasion involving at least two SR configurations.

Another example, operation corresponding to the above step S101 and other steps is executed in any SR transmission occasion, no matter whether or not the first UCI and at least two SR configurations are involved in the SR transmission occasion, i.e. the first UCI and SR coexist.

Or, operation corresponding to the above step S101 and other steps is executed only in an SR transmission occasion involving the first UCI and at least two SR configurations, i.e. the first UCI and SRs coexist.

Assuming that the terminal has two SR configurations: $SR_1$ and $SR_2$. and the transmission opportunities of $SR_1$ and $SR_2$ overlap at time 1 according to configuration cycles and offset values of $SR_1$ and $SR_2$. In the condition that HARQ-ACK transmission also exists at time 1 and HARQ-ACK is configured to be transmitted through PUCCH format 3, the value of M can be determined to be 2 according to the quantity of the configured SR configurations, or the quantity of the overlapping SR configurations at the same time, or the configuration information sent by the base station, that is, SR information with 2 bits needs to be cascaded with HARQ-ACK and to be transmitted together.

Assuming that at time 1, a terminal side needs the feedback of $SR_1$, i.e. $SR_1$ is the positive SR, then the solution is as follows.

Mode 1: A first bit of 2 bits where the SR information with 2 bits is located corresponds to $SR_1$ and a second bit of the 2 bits corresponds to $SR_2$. Assuming that "1" represents the positive SR state and "0" represents the negative SR state.

Terminal side: determining that the SR information with 2 bits is "10" and cascaded the "10" with HARQ-ACK, for example, cascaded the "10" after HARQ-ACK information, and then performing channel coding and rate matching on the cascaded information and mapping to a corresponding resource for transmission according to a determined transmission resource of PUCCH format 3 for HARQ-ACK transmission.

Base station side: assuming that joint coding and rate matching are conducted on HARQ-ACK and the 2-bit SRs, receiving an information sequence transmitted by the terminal on the determined transmission resource of PUCCH format 3 for HARQ-ACK transmission, extracting the latter 2-bit information in the information sequence as the SR information with 2 bits, determining that the terminal has sent positive $SR_1$ according to the indication state of each bit of 2 bits where the SR information with 2 bits is located, and performing corresponding uplink scheduling on the terminal according to a service demand corresponding to $SR_1$.

Mode 2: determining the SR information with 2 bits according to the SRs to be transmitted and a predefined mapping table.

Terminal side: according to the above Table 1, determining that the SR information with 2 bits is "01" and cascaded the "01" with HARQ-ACK, for example, cascaded the "01" after the HARQ-ACK information, and then performing channel coding and rate matching on the cascaded information and mapping to the corresponding resource for transmission according to the determined transmission resource of PUCCH format 3.

Base station side: assuming that joint coding and rate matching are conducted on HARQ-ACK and the SR information with 2 bits, receiving the information sequence transmitted by the terminal on the determined transmission resource of PUCCH format 3 for HARQ-ACK transmission, extracting the latter 2-bit information in the information sequence as the SR information with 2 bits, determining that the terminal has sent positive $SR_1$ according to the state of the SR information with 2 bits and Table 1, and performing corresponding uplink scheduling on the terminal according to the service demand corresponding to $SR_1$.

In one implementation of the above embodiment, SR transmission can be performed in the above modes in any transmission occasion of $SR_1$ and $SR_2$ overlapping with that of other the UCI. That is, if there is only one SR configuration in one SR transmission occasion and the transmission occasion overlaps with that of other UCI, the above process can also be performed. In this case, it is assumed that the SR information with M bits is transmitted simultaneously with other UCI in any SR transmission occasion. In this way, a unified transmission solution can be applied to any SR transmission occasion.

In another implementation of the above embodiment, the above M-bit SR transmission process is executed when the transmission opportunities of the plurality of SR configurations overlap and there is other UCI in the transmission occasion. If there is only one SR configuration in one SR transmission occasion and there is other UCI in the transmission occasion, transmission may be performed in other agreed modes instead of the above modes. For example, the positive SR is implicitly expressed by transmitting other UCI on an SR resource corresponding to an SR to be transmitted, or only 1-bit SR is cascaded with other UCI and transmitted simultaneously on resources corresponding to other UCI.

For example, if only $SR_1$ has a transmission occasion at time 2, then only one $SR_1$ may need to be transmitted at time 2, and the above M-bit method may not be adopted. When $SR_1$ needs to be transmitted (i.e. positive SRI), positive $SR_1$ may be implicitly expressed by transmitting other UCI on the SR resource corresponding to $SR_1$ to be transmitted, or no matter whether positive $SR_1$ exists, at time 2, a 1-bit SR is cascaded with other UCI and transmitted simultaneously on the resources corresponding to other UCI. Since there is only one SR configuration at time 2. The base station can always determine that the 1-bit SR corresponds to $SR_1$.

Another example, if only $SR_2$ has a transmission occasion at time 3, then only one $SR_2$ may need to be transmitted at time 3, and the above-mentioned M-bit method may not be adopted. When $SR_2$ needs to be transmitted (i.e. positive $SR_2$), positive $SR_2$ may be implicitly expressed by transmitting other UCI on the SR resource corresponding to $SR_2$ to be transmitted, or no matter whether positive $SR_2$ exists, at time 3, a 1-bit SR is cascaded with other UCI and transmitted simultaneously on the resources corresponding to other UCI. Since there is only one SR configuration at time 3. The base station can always determine that the 1-bit SR corresponds to $SR_2$. In this case, compared with the case where M bits are used all the time, SR reporting overhead is saved, but the transmission solutions used in different SR transmission opportunities may be different. Since the base station and the terminal know the specific configuration information of the plurality of SR configurations in advance, such as the cycle, the overlapping situation of SR configurations in each SR transmission occasion can be known in advance, so that a corresponding transmission solution is selected for transmission, and there is no ambiguity in understanding the transmission solution for the base station and the terminal.

The above embodiment takes the overlapping transmission of the SRs and HARQ-ACK as an example, but it also applies in the condition that HARQ-ACK is replaced by the CSI, or in the condition that HARQ-ACK and the CSI coexist.

When the CSI and HARQ-ACK coexist, the CSI may be transmitted on one of PUCCH format 2, PUCCH format 3 or PUCCH format 4. While HARQ-ACK is transmitted on PUCCH format 0 or 1, or HARQ-ACK and the CSI are both transmitted on PUCCH format 2, PUCCH format 3 or PUCCH format 4. This also applies when PUCCH format 3 is replaced with PUCCH format 2, PUCCH format 4, or other PUCCH formats carrying more than 2 bits of the UCI.

In the transmission method for distinguishing the plurality of SR configurations provided by embodiments of the present disclosure, the terminal cascades an M-bit SR with the first UCI and simultaneously transmits same, the SR information with M bits is configured for indicating the SR states of the plurality of SR configurations of the terminal, ensuring that the base station performs correct uplink scheduling on the terminal.

Embodiment 2

Figure 2:
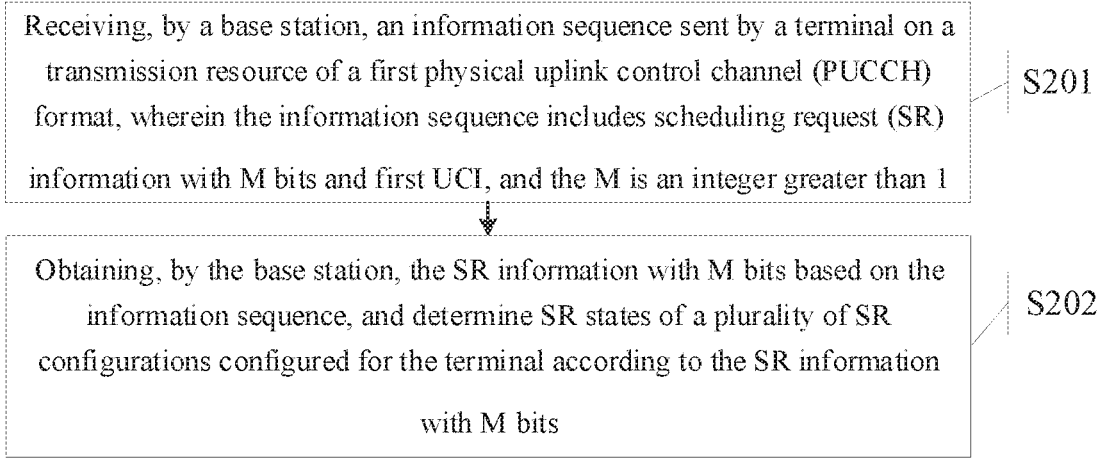
FIG. 2 is a flow chart of a transmission method provided by the embodiments of the present disclosure.

Referring to FIG. 2, based on the same inventive concept, an embodiment of the present disclosure provides a transmission method, the process of which can be described as follows.

S201: an information sequence sent by a terminal is received by a base station on a transmission resource of a first PUCCH format, and the information sequence includes SR information with M bits and first UCI, and M is an integer greater than 1.

S202: the SR information with M bits is obtained by the base station based on the information sequence, and SR states of a plurality of SR configurations configured for the terminal are determined according to the SR information with M bits.

In one possible implementation, the SR information with M bits corresponds to a plurality of SR configurations, one bit of the M bits corresponds to one SR configuration of the plurality of SR configurations, and a value of the one bit indicates that the one SR configuration is in a positive SR state or a negative SR state.

In one possible implementation, the M is a maximum quantity of a plurality of SR configurations supported in system configured for the terminal; or the M is a quantity of the plurality of SR configurations configured for the terminal; or the M is a quantity of SR configurations with overlapping transmission occasions within the plurality of SR configurations configured for the terminal; or a value of the M is notified to the terminal by a network side through configuration signaling.

In one possible implementation, the SR information with M bits corresponds to the plurality of SR configurations based on a preset order of the plurality of SR configurations; or the SR information with M bits corresponds to the plurality of SR configurations based on a corresponding relationship notified by a network layer.

In one possible implementation, only one bit of the M bits indicates the positive SR state.

In one possible implementation, a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, and one bit state of the A bit states indicates that one SR configuration of the A SR configurations is in a positive SR state, and the first bit state is any one of the plurality of bit states.

In one possible implementation, the plurality of bit states further include reserved states in the condition that a quantity of states of the plurality of bit states is greater than or is equal to a quantity of the plurality of SR configurations plus 1.

In one possible implementation, the M is determined according to a maximum quantity A1 of a plurality of SR configurations supported in system configured for the terminal; or the M is determined according to a quantity A2 of the plurality of SR configurations configured for the terminal; or the M is determined according to a quantity A3 of SR configurations with overlapping transmission occasions within the plurality of SR configurations configured for the terminal; or a value of the M is notified to the terminal by a network side through configuration signaling.

In one possible implementation, M is determined through a formula: $M=\text{ceil}(\log_2(Ai+1))$; and ceil means rounding up and Ai is A1 or A2 or A3.

In one possible implementation, the first UCI includes at least one of hybrid automatic repeat request-acknowledgement (HARQ-ACK) or channel state information (CSI).

In one possible implementation, the CSI includes at least one of periodic CSI, aperiodic CSI, or semi-persistent scheduling CSI.

In one possible implementation, the method further includes:

determining, by the base station, that the SR information with M bits and a first part of CSI are cascaded; and performing, by the base station, channel decoding on cascaded SR information with M bits and first part of CSI, and a second part of CSI respectively;

and the first UCI includes the CSI and the CSI consists of the first part of CSI and the second part of CSI.

In one possible implementation, the first PUCCH format is PUCCH format 2 or PUCCH format 3 or PUCCH format 4 or a PUCCH format for carrying more than 2 bits of the first UCI.

Embodiment 3

Figure 3:
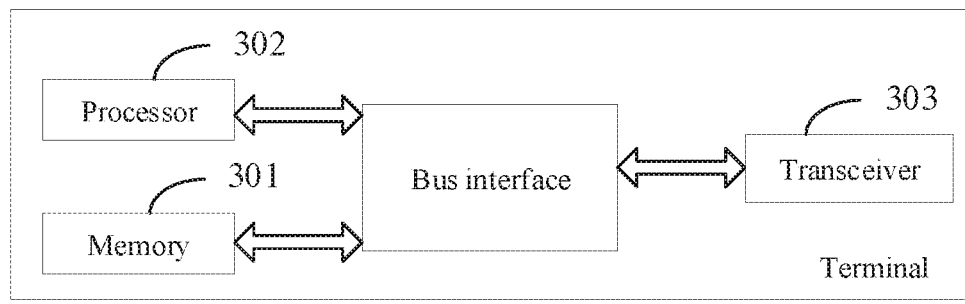
FIG. 3 is a schematic diagram of a terminal provided by the embodiments of the present disclosure.

Referring to FIG. 3, an embodiment of the present disclosure also provides a terminal, including a memory 301, a processor 302 and a transceiver 303. The memory 301 and the transceiver 303 may be connected to the processor 302 through a bus interface (shown in FIG. 3 as an example), or may be connected to the processor 302 through a special connection line.

The memory 301 can be configured to store programs. The processor 302 may be configured to read a program in the memory 301 to determine the SR information with M bits, and the M is an integer greater than 1; and the transceiver is configured to send the SR information with M bits and the first UCI to a base station simultaneously.

In one possible implementation, the SR information with M bits corresponds to a plurality of SR configurations, one bit of the M bits corresponds to one SR configuration of the plurality of SR configurations, and a value of the one bit indicates that the one SR configuration is in a positive SR state or a negative SR state.

In one possible implementation, the M is a maximum quantity of a plurality of SR configurations supported in system configured for the terminal; or the M is a quantity of the plurality of SR configurations configured for the terminal; or the M is a quantity of SR configurations with overlapping transmission occasions within the plurality of SR configurations configured for the terminal; or a value of the M is notified to the terminal by a network side through configuration signaling.

In one possible implementation, the processor is further configured to make the SR information with M bits correspond to the plurality of SR configurations based on the preset order of the plurality of SR configurations; or make the SR information with M bits correspond to the plurality of SR configurations based on a corresponding relationship notified by a network layer.

In one possible implementation, only one bit of the M bits indicates the positive SR state.

In one possible implementation, a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, and one bit state of the A bit states indicates that one SR configuration of the A SR configurations is in a positive SR state, and the first bit state is any one of the plurality of bit states.

In one possible implementation, the plurality of bit states further include reserved states in the condition that a quantity of states of the plurality of bit states is greater than or is equal to a quantity of the plurality of SR configurations plus 1.

In one possible implementation, the processor is further configured to: determine the M according to a maximum quantity A1 of a plurality of SR configurations supported in system configured for the terminal; or determine the M according to a quantity A2 of the plurality of SR configurations configured for the terminal; or determine the M according to a quantity A3 of SR configurations with overlapping transmission occasions within the plurality of SR configurations configured for the terminal; or determine the M by a value of the M notified by a network side to the terminal through configuration signaling.

In one possible implementation, the processor is further configured to determine the M is determined through the following formula: M=ceil($\log_2$(Ai+1)); and ceil means rounding up and Ai is A1 or A2 or A3.

In one possible implementation, the transceiver 303 is configured to: cascade the SR information with M bits and the first UCI; perform channel coding on cascaded SR information with M bits and first UCI; and send channel coded SR information with M bits and first UCI to the base station.

In one possible implementation, the first UCI includes at least one of hybrid automatic repeat request-acknowledgement (HARQ-ACK) or channel state information (CSI).

In one possible implementation, the CSI includes at least one of periodic CSI, aperiodic CSI, or semi-persistent scheduling CSI.

In one possible implementation, the transceiver 303 is configured to: cascade the SR information with M bits and a first part of CSI; perform channel coding on cascaded SR information with M bits and first part of CSI, and a second part of CSI respectively; and send channel coded information to the base station; and the first UCI includes the CSI and the CSI consists of the first part of CSI and the second part of CSI.

In one possible implementation, the transceiver 303 is configured to: send the SR information with M bits and the first UCI to the base station simultaneously through a transmission resource of a first PUCCH format; and the first PUCCH format is PUCCH format 2 or PUCCH format 3 or PUCCH format 4 or a PUCCH format for carrying more than 2 bits of the first UCI.

In one possible implementation, the processor 302 is configured to: determine whether a preset condition is satisfied; and determine the SR information with M bits in response to that the preset condition is satisfied.

In one possible implementation, the preset condition is that: a current transmission time is an SR transmission occasion; or the current transmission time is an SR transmission occasion, and a plurality of SR configurations are in the SR transmission occasion.

In FIG. 3, a bus architecture may include any quantity of interconnected buses and bridges. Particularly, one or more processors represented by the processor 302 are connected with various circuits of memories represented by the memory 301. The bus architecture can also link together various other circuits such as peripheral equipment, voltage regulators, power management circuits, etc., which are well known in the art, and therefore will not be further described herein. A bus interface provides an interface. The transceiver 303 may be a plurality of elements, i.e., including a transmitter and a receiver, providing units for communicating with various other devices over a transmission medium. The processor 302 is responsible for managing the bus architecture and normal processing, and the memory 301 can store data used by the processor 302 for operation.

Embodiment 4

Figure 4:
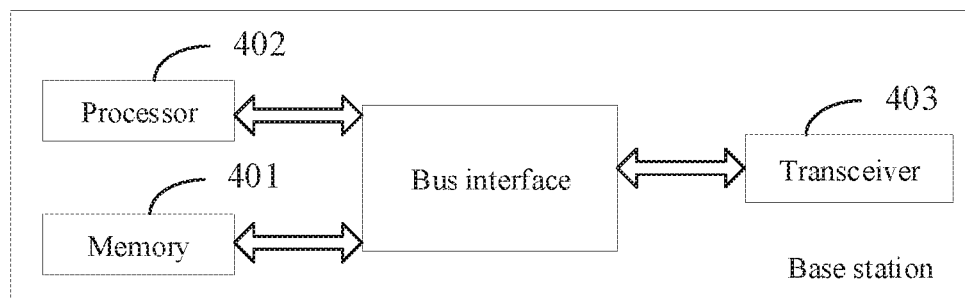
FIG. 4 is a schematic diagram of a base station provided by the embodiments of the present disclosure.

Referring to FIG. 4, based on the same inventive concept, an embodiment of the present disclosure provides a base station, including a memory 401, a processor 402 and a transceiver 403. The memory 401 and the transceiver 403 may be connected to the processor 402 through a bus interface (shown in FIG. 4 as an example), or may be connected to the processor 402 through a special connection line.

The memory 401 can be configured to store programs. The transceiver 403 may receive an inter-node signaling message sent by the main base station. The processor 402 is configured to read instructions in the memory 401 to receive an information sequence sent by a terminal on a transmission resource of a first PUCCH format through the transceiver, and the information sequence includes SR information with M bits and first UCI, and the M is an integer greater than 1; obtain the SR information with M bits based on the information sequence; and determine SR states of a plurality of SR configurations configured for the terminal according to the SR information with M bits.

In one possible implementation, the SR information with M bits corresponds to the plurality of SR configurations, and one bit of the SR information with M bits corresponds to one SR configuration, and a value of each bit indicates that the corresponding SR configuration is in a positive SR state or a negative SR state.

In one possible implementation, the M is a maximum quantity of a plurality of SR configurations supported in system configured for the terminal; or the M is a quantity of the plurality of SR configurations configured for the terminal; or the M is a quantity of SR configurations with overlapping transmission occasions within the plurality of SR configurations configured for the terminal; or a value of the M is notified to the terminal by a network side through configuration signaling.

In one possible implementation, the SR information with M bits corresponds to the plurality of SR configurations based on a preset order of the plurality of SR configurations; or the SR information with M bits corresponds to the plurality of SR configurations based on a corresponding relationship notified by a network layer.

In one possible implementation, only one bit of the M bits indicates the positive SR state.

In one possible implementation, a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, and one bit state of the A bit states indicates that one SR configuration of the A SR configurations is in a positive SR state, and the first bit state is any one of the plurality of bit states.

In one possible implementation, the plurality of bit states further include reserved states in the condition that a quantity of states of the plurality of bit states is greater than or is equal to a quantity of the plurality of SR configurations plus 1.

In one possible implementation, the M is determined according to a maximum quantity A1 of a plurality of SR configurations supported in system configured for the terminal; or the M is determined according to a quantity A2 of the plurality of SR configurations configured for the terminal; or the M is determined according to a quantity A3 of SR configurations with overlapping transmission occasions within the plurality of SR configurations configured for the terminal; or a value of the M is notified to the terminal by a network side through configuration signaling.

In one possible implementation, the M is determined through a formula: M=ceil($\log_2$(Ai+1)); and ceil means rounding up and Ai is A1 or A2 or A3.

In one possible implementation, the first UCI includes at least one of hybrid automatic repeat request-acknowledgement (HARQ-ACK) or channel state information (CSI).

In one possible implementation, the CSI includes at least one of periodic CSI, aperiodic CSI, or semi-persistent scheduling CSI.

In one possible implementation, the processor 402 is configured to:

determine that the SR information with M bits and the first part of CSI are cascaded; and perform channel decoding on cascaded SR information with M bits and first part of CSI, and a second part of CSI respectively;

and the first UCI includes the CSI and the CSI consists of the first part of CSI and the second part of CSI.

In one possible implementation, the first PUCCH format is PUCCH format 2 or PUCCH format 3 or PUCCH format 4 or a PUCCH format for carrying more than 2 bits of the first UCI.

In FIG. 4, a bus architecture may include any quantity of interconnected buses and bridges. Particularly, one or more processors represented by the processor 402 are connected with various circuits of memories represented by the memory 401. The bus architecture can also link together various other circuits such as peripheral devices, voltage regulators, power management circuits, etc., which are well known in the art, and therefore will not be further described herein. A bus interface provides an interface. The transceiver 403 may be a plurality of elements, i.e., including a transmitter and a receiver, providing units for communicating with various other devices over a transmission medium. The processor 402 is responsible for managing the bus architecture and normal processing, and the memory 401 can store data used by the processor 402 for operation.

Embodiment 5

Figure 5:
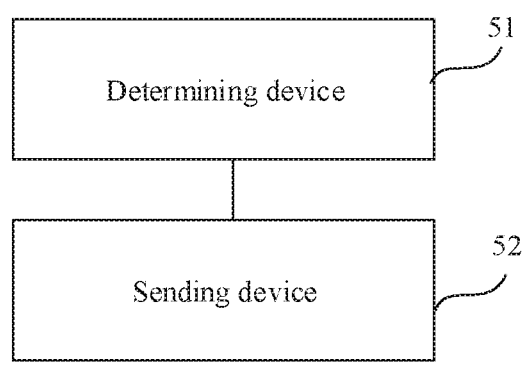
FIG. 5 is a schematic device diagram of a terminal provided by the embodiments of the present disclosure.

Referring to FIG. 5, based on the same inventive concept, an embodiment of the present disclosure provides a terminal, including:

a determining device 51, configured to determine SR information with M bits, and M is an integer greater than 1; and a sending device 52, configured to send the SR information with M bits and first UCI to a base station simultaneously.

In one possible implementation, the SR information with M bits corresponds to a plurality of SR configurations, one bit of the M bits corresponds to one SR configuration of the plurality of SR configurations, and a value of the one bit indicates that the one SR configuration is in a positive SR state or a negative SR state.

In one possible implementation, the M is a maximum quantity of a plurality of SR configurations supported in system configured for the terminal; or the M is a quantity of the plurality of SR configurations configured for the terminal; or the M is a quantity of SR configurations with overlapping transmission occasions within the plurality of SR configurations configured for the terminal; or a value of the M is notified to the terminal by a network side through configuration signaling.

In one possible implementation, the SR information with M bits corresponds to the plurality of SR configurations based on a preset order of the plurality of SR configurations; or the SR information with M bits corresponds to the plurality of SR configurations based on a corresponding relationship notified by a network layer.

In one possible implementation, only one bit of the M bits indicates the positive SR state.

In one possible implementation, a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, and one bit state of the A bit states indicates that one SR configuration of the A SR configurations is in a positive SR state, and the first bit state is any one of the plurality of bit states.

In one possible implementation, the plurality of bit states further include reserved states in the condition that a quantity of states of the plurality of bit states is greater than or is equal to a quantity of the plurality of SR configurations plus 1.

In one possible implementation, the M is determined according to a maximum quantity A1 of a plurality of SR configurations supported in system configured for the terminal; or the M is determined according to a quantity A2 of the plurality of SR configurations configured for the terminal; or the M is determined according to a quantity A3 of SR configurations with overlapping transmission occasions within the plurality of SR configurations configured for the terminal; or a value of the M is notified to the terminal by a network side through configuration signaling.

In one possible implementation, the M is determined through a formula: M=ceil($\log_2$(Ai+1)); and ceil means rounding up and Ai is A1 or A2 or A3.

In one possible implementation, the sending device 52 is configured to:

cascade the SR information with M bits and the first UCI;

perform channel coding on cascaded SR information with M bits and first UCI; and send channel coded SR information with M bits and first UCI to the base station.

In one possible implementation, the first UCI includes at least one of hybrid automatic repeat request-acknowledgement (HARQ-ACK) or channel state information (CSI).

In one possible implementation, the CSI includes at least one of periodic CSI, aperiodic CSI, or semi-persistent scheduling CSI.

In one possible implementation, the sending device 52 is configured to:

cascade the SR information with M bits and a first part of CSI;

perform channel coding on cascaded SR information with M bits and first part of CSI, and a second part of CSI respectively; and send channel coded information to the base station;

and the first UCI includes the CSI and the CSI consists of the first part of CSI and the second part of CSI.

In one possible implementation, the sending device 52 is configured to:

send the SR information with M bits and the first UCI to the base station simultaneously on a transmission resource of a first PUCCH format;

and the first PUCCH format is PUCCH format 2 or PUCCH format 3 or PUCCH format 4 or a PUCCH format for carrying more than 2 bits of the first UCI.

In one possible implementation, the determining device is configured to:

determine whether a preset condition is satisfied; and determine the SR information with M bits in response to that the preset condition is satisfied.

In one possible implementation, the preset condition is that: a current transmission time is an SR transmission occasion; or the current transmission time is an SR transmission occasion, and a plurality of SR configurations are in the SR transmission occasion.

Embodiment 6

Figure 6:
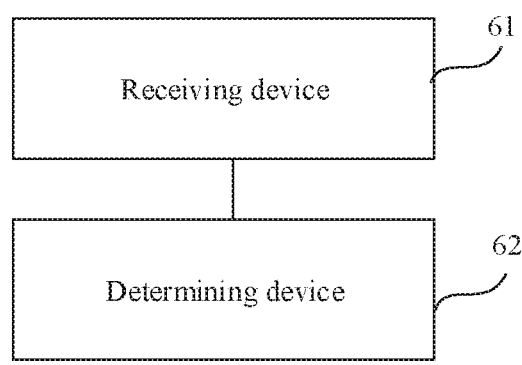
FIG. 6 is a schematic device diagram of a base station provided by the embodiments of the present disclosure.

Referring to FIG. 6, based on the same inventive concept, an embodiment of the present disclosure provides a base station, including:

a receiving device 61, configured to receive an information sequence sent by a terminal on a transmission resource of a first PUCCH format, and the information sequence includes SR information with M bits and first UCI, and the M is an integer greater than 1; and a determining device 62, configured to obtain the SR information with M bits based on the information sequence, and determine SR states of a plurality of SR configurations configured for the terminal according to the SR information with M bits.

In one possible implementation, the SR information with M bits corresponds to a plurality of SR configurations, one bit of the M bits corresponds to one SR configuration of the plurality of SR configurations, and a value of the one bit indicates that the one SR configuration is in a positive SR state or a negative SR state.

In one possible implementation, the M is a maximum quantity of a plurality of SR configurations supported in system configured for the terminal; or the M is a quantity of the plurality of SR configurations configured for the terminal; or the M is a quantity of SR configurations with overlapping transmission opportunities SR configurations configured for the terminal; or a value of the M is notified to the terminal by a network side through configuration signaling.

In one possible implementation, the SR information with M bits corresponds to the plurality of SR configurations based on a preset order of the plurality of SR configurations; or the SR information with M bits corresponds to the plurality of SR configurations based on a corresponding relationship notified by a network layer.

In one possible implementation, only one bit of the M bits indicates the positive SR state.

In one possible implementation, a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, and one bit state of the A bit states indicates that one SR configuration of the A SR configurations is in a positive SR state, and the first bit state is any one of the plurality of bit states.

In one possible implementation, the plurality of bit states further include reserved states in the condition that a quantity of states of the plurality of bit states is greater than or is equal to a quantity of the plurality of SR configurations plus 1.

In one possible implementation, the M is determined according to a maximum quantity A1 of a plurality of SR configurations supported in system configured for the terminal; or the M is determined according to a quantity A2 of the plurality of SR configurations configured for the terminal; or the M is determined according to a quantity A3 of SR configurations with overlapping transmission occasions within the plurality of SR configurations configured for the terminal; or a value of the M is notified to the terminal by a network side through configuration signaling.

In one possible implementation, the M is determined through a formula: M=ceil($\log_2$(Ai+1)); and ceil means rounding up and Ai is A1 or A2 or A3.

In one possible implementation, the first UCI includes at least one of hybrid automatic repeat request-acknowledgement (HARQ-ACK) or channel state information (CSI).

In one possible implementation, the CSI includes at least one of periodic CSI, aperiodic CSI, or semi-persistent scheduling CSI.

In one possible implementation, the determining device 62 is configured to:

determine that the SR information with M bits and a first part of CSI are cascaded; and perform channel decoding on cascaded SR information with M bits and first part of CSI, and a second part of CSI respectively;

and the first UCI includes the CSI and the CSI consists of the first part of CSI and the second part of CSI.

In one possible implementation, the first PUCCH format is PUCCH format 2 or PUCCH format 3 or PUCCH format 4 or a PUCCH format for carrying more than 2 bits of the first UCI.

Embodiment 7

Based on the same inventive concept, an embodiment of the present disclosure provides a computer readable storage medium.

The computer readable storage medium stores computer instructions which is executed on a computer to cause the computer to execute the method as shown in FIG. 1 and FIG. 2.

In the specific implementation process, the computer readable storage medium includes: a universal serial bus flash drive (USB), a mobile hard disk, a read-only memory (ROM), a random access memory (RAM), a magnetic disk or an optical disk and other storage media that can store program codes.

The embodiments of the present disclosure may be provided as methods, systems, or computer program products. Therefore, the present disclosure may take the form of a full hardware embodiment, a full software embodiment, or an embodiment combining software and hardware aspects. Furthermore, the present disclosure may take the form of a computer program product implemented on one or more computer usable storage media (including but not limited to a magnetic disk memory, a CD-ROM, an optical memory, etc.) having computer usable program code embodied therein.

The present disclosure is described with reference to flowcharts and/or block diagrams of the method, device (system), and computer program product according to the embodiments of the present disclosure. It should be understood that each flow and/or block in the flowcharts and/or block diagrams, and combinations of flows and/or blocks in the flowcharts and/or block diagrams, may be implemented by computer program instructions. These computer program instructions may be provided to a processor of a general purpose computer, a special purpose computer, an embedded processor, or other programmable data processing apparatus to produce a machine, and the instructions executed by the processor of the computer or other programmable data processing apparatus produce a device for implementing the functions specified in one or more flows in the flowcharts and/or one or more blocks in the block diagrams.

These computer program instructions may also be stored in a computer-readable memory which can direct a computer or other programmable data processing apparatus to function in a particular manner, and the instructions stored in the computer-readable memory produce an article of manufacture including an instruction device which implements the functions specified in one or more flows in the flowcharts and/or one or more blocks in the block diagrams.

These computer program instructions may also be loaded onto a computer or other programmable data processing apparatus and a series of operational steps are performed on the computer or other programmable apparatus to produce a computer implemented process, and the instructions executed on the computer or other programmable apparatus provide steps for implementing the functions specified in one or more flows in the flowcharts and/or one or more blocks in the block diagrams.

The invention claimed is:

1. A transmission method, comprising:
   determining, by a terminal, scheduling request (SR) information with M bits, wherein the M is an integer greater than 1; and
   sending, by the terminal, the SR information with M bits and first uplink control information (UCI) to a base station simultaneously;
   wherein sending, by the terminal, the SR information with M bits and the first UCI to the base station simultaneously comprises:
   cascading, by the terminal, the SR information with M bits and a first part of CST;
   performing, by the terminal, channel coding on cascaded SR information with M bits and first part of CSI, and a second part of CSI respectively; and
   sending, by the terminal, channel coded information to the base station;
   wherein the first UCI comprises the CSI and the CSI consists of the first part of CSI and the second part of CSI.

2. The method according to claim 1, wherein determining, by a terminal, the SR information with M bits, comprises one of the following method:
   method 1:
   the SR information with M bits corresponds to a plurality of SR configurations, one bit of the M bits corresponds to one SR configuration of the plurality of SR configurations, and a value of the one bit indicates that the one SR configuration is in a positive SR state or a negative SR state;
   method 2:
   a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, wherein one bit state of the A bit states indicates that one SR configuration of the A SR configurations is in a positive SR state, and the first bit state is any one of the plurality of bit states.

3. The method according to claim 2, further comprising at least one of the method 2-1 or method 2-2:
   the method 2-1:
   the plurality of bit states further comprise reserved states in the condition that a quantity of states of the plurality of bit states is greater than or is equal to a quantity of the plurality of SR configurations plus 1;
   the method 2-2:
   the value of M is determined by one of the following: the M is determined according to a maximum quantity A1 of a plurality of SR configurations supported in system configured for the terminal, wherein the M is determined through a formula: M=ceil $(\log_2(A1+1))$, and ceil means rounding up;
   the M is determined according to a quantity A2 of the plurality of SR configurations configured for the terminal, wherein the M is determined through a formula: M=ceil $(\log_2(A2+1))$, and ceil means rounding up;
   the M is determined according to a quantity A3 of SR configurations with overlapping transmission occasions within the plurality of SR configurations configured for the terminal, wherein the M is determined through a formula: M=ceil $(\log_2 (A3+1))$, and ceil means rounding up; or the M is determined by a value of the M notified by a network side to the terminal through configuration signaling.

4. The method according to claim 2, wherein in the condition that the method 1 is used, the method comprises at least one of method 1-1, method 1-2, or method 1-3:
the method 1-1:
the value of M is determined by one of the following:
the M is a maximum quantity of a plurality of SR configurations supported in system configured for the terminal;
the M is a quantity of the plurality of SR configurations configured for the terminal;
the M is a quantity of SR configurations with overlapping transmission occasions within the plurality of SR configurations configured for the terminal;
a value of the M is notified to the terminal by a network side through configuration signaling;
the method 1-2:
the SR information with M bits corresponding to a plurality of SR configurations comprises one of the following:
the SR information with M bits corresponds to the plurality of SR configurations based on a preset order of the plurality of SR configurations;
the SR information with M bits corresponds to the plurality of SR configurations based on a corresponding relationship notified by a network layer;
the method 1-3:
only one bit of the M bits indicates the positive SR state.

5. The method according to claim 1, wherein sending, by the terminal, the SR information with M bits and the first UCI to the base station simultaneously comprises
sending, by the terminal, the SR information with M bits and the first UCI to the base station simultaneously on a transmission resource of a first physical uplink control channel (PUCCH) format;
wherein the first PUCCH format is PUCCH format 2 or PUCCH format 3 or PUCCH format 4 or a PUCCH format for carrying more than 2 bits of the first UCI.

6. The method according to claim 1, further comprising:
determining, by the terminal, whether a preset condition is satisfied; and
determining, by the terminal, the SR information with M bits in response to that the preset condition is satisfied;
wherein the preset condition is that:
a current transmission time is an SR transmission occasion; or
the current transmission time is an SR transmission occasion, and a plurality of SR configurations are in the SR transmission occasion.

7. A transmission method, comprising:
receiving, by a base station, an information sequence sent by a terminal on a transmission resource of a first physical uplink control channel (PUCCH) format, wherein the information sequence comprises scheduling request (SR) information with M bits and first uplink control information (UCI), and the M is an integer greater than 1;
obtaining, by the base station, the SR information with M bits based on the information sequence; and
determining, by the base station, SR states of a plurality of SR configurations configured for the terminal according to the SR information with M bits;
determining, by the base station, that the SR information with M bits and a first part of CSI are cascaded; and
performing, by the base station, channel decoding on cascaded SR information with M bits and first part of CSI, and a second part of CSI respectively;
wherein the first UCI comprises the CSI and the CSI consists of the first part of CSI and the second part of CSI.

8. The method according to claim 7, wherein the SR information with M bits is determined according to one of the following method:
method 1:
the SR information with M bits corresponds to a plurality of SR configurations, one bit of the M bits corresponds to one SR configuration of the plurality of SR configurations, and a value of the one bit indicates that the one SR configuration is in a positive SR state or a negative SR state;
method 2:
a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, wherein one bit state of the A bit states indicates that one SR configuration of the A SR configurations is in a positive SR state, and the first bit state is any one of the plurality of bit states.

9. The method according to claim 8, wherein in the condition that the method 1 is used, the method comprising at least one of method 1-1, method 1-2, or method 1-3:
the method 1-1:
the value of M is determined by one of the following:
the M is a maximum quantity of a plurality of SR configurations supported in system configured for the terminal;
the M is a quantity of the plurality of SR configurations configured for the terminal;
the M is a quantity of SR configurations with overlapping transmission occasions within the plurality of SR configurations configured for the terminal;
a value of the M is notified to the terminal by a network side through configuration signaling;
the method 1-2:
the SR information with M bits corresponding to a plurality of SR configurations comprises one of the following:
the SR information with M bits corresponds to the plurality of SR configurations based on a preset order of the plurality of SR configurations;
the SR information with M bits corresponds to the plurality of SR configurations based on a corresponding relationship notified by a network layer;
the method 1-3:
only one bit of the M bits indicates the positive SR state;
wherein in the condition that the method 2 is used, the method further comprising at least one of method 2-1 or method 2-2:
the method 2-1:
the plurality of bit states further comprise reserved states in the condition that a quantity of states of the plurality of bit states is greater than or is equal to a quantity of the plurality of SR configurations plus 1;
the method 2-2:
the value of M is determined by one of the following: the M is determined according to a maximum quantity A1 of a plurality of SR configurations supported in system configured for the terminal, wherein the M is determined through a formula: M=ceil ($\log_2$(A1+1)), and ceil means rounding up;
the M is determined according to a quantity A2 of the plurality of SR configurations configured for the terminal, wherein the M is determined through a formula: M=ceil ($\log_2$(A2+1)), and ceil means rounding up;
the M is determined according to a quantity A3 of SR configurations with overlapping transmission occasions within the plurality of SR configurations configured for the terminal, wherein the M is determined through a formula: M=ceil ($\log_2$(A3+1)), and ceil means rounding up; or
a value of the M is notified to the terminal by a network side through configuration signaling.

10. The method according to claim 7, wherein
the first PUCCH format is PUCCH format 2 or PUCCH format 3 or PUCCH format 4 or a PUCCH format for carrying more than 2 bits of the first UCI.

11. A terminal, comprising:
a memory, configured to store instructions;
a processor, configured to read the instructions in the memory to determine scheduling request (SR) with M bits, wherein the M is an integer greater than 1; and
a transceiver, configured to send the SR information with M bits and first uplink control information (UCI) to a base station simultaneously;
the transceiver is further configured to:
cascade the SR information with M bits and a first part of CST;
perform channel coding on cascaded SR information with M bits and first part of CSI, and a second part of CSI respectively; and
send channel coded information to the base station;
wherein the first UCI comprises the CSI and the CSI consists of the first part of CSI and the second part of CSI.

12. The terminal according to claim 11, wherein the SR information with M bits is determined according to one of the following mode:
mode 1:
the SR information with M bits corresponds to a plurality of SR configurations, one bit of the M bits corresponds to one SR configuration of the plurality of SR configurations, and a value of the one bit indicates that the one SR configuration is in a positive SR state or a negative SR state;
mode 2:
a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, wherein one bit state of the A bit states indicates that one SR configuration of the A SR configurations is in a positive SR state, and the first bit state is any one of the plurality of bit states.

13. The terminal according to claim 12, wherein further comprising at least one of mode 2-1 or mode 2-2:
the mode 2-1:
the plurality of bit states further comprise reserved states in the condition that a quantity of states of the plurality of bit states is greater than or is equal to a quantity of the plurality of SR configurations plus 1;
the mode 2-2:
the value of M is determined by one of the following: the M is determined according to a maximum quantity A1 of a plurality of SR configurations supported in system configured for the terminal, wherein the M is determined through a formula: M=ceil ($\log_2$(A1+1)), and ceil means rounding up;
the M is determined according to a quantity A2 of the plurality of SR configurations configured for the terminal, wherein the M is determined through a formula: M=ceil ($\log_2$(A2+1)), and ceil means rounding up;
the M is determined according to a quantity A3 of SR configurations with overlapping transmission occasions within the plurality of SR configurations configured for the terminal, wherein the M is determined through a formula: M=ceil ($\log_2$(A3+1)), and ceil means rounding up; or
the M is determined by a value of the M notified by a network side to the terminal through configuration signaling.

14. The terminal according to claim 12, wherein in the condition that the mode 1 is used, the mode 1 comprises at least one of the mode 1-1, mode 1-2, or mode 1-3:
the mode 1-1:
the value of M is determined by one of the following:
the M is a maximum quantity of a plurality of SR configurations supported in system configured for the terminal;
the M is a quantity of the plurality of SR configurations configured for the terminal;
the M is a quantity of SR configurations with overlapping transmission occasions within the plurality of SR configurations configured for the terminal;
a value of the M is notified to the terminal by a network side through configuration signaling;
the mode 1-2:
the SR information with M bits corresponding to a plurality of SR configurations comprises one of the following:
the SR information with M bits corresponds to the plurality of SR configurations based on a preset order of the plurality of SR configurations;
the SR information with M bits corresponds to the plurality of SR configurations based on a corresponding relationship notified by a network layer;
the mode 1-3:
only one bit of the M bits indicates the positive SR state.

15. The terminal according to claim 11, wherein the transceiver is further configured to
send, by the terminal, the SR information with M bits and the first UCI to the base station simultaneously on a transmission resource of a first physical uplink control channel (PUCCH) format; wherein the first PUCCH format is PUCCH format 2 or PUCCH format 3 or PUCCH format 4 or a PUCCH format for carrying more than 2 bits of the first UCI.

16. The terminal according to claim 11, wherein the processor is further configured to:
determine whether a preset condition is satisfied; and
determine the SR information with M bits in response to that the preset condition is satisfied;
wherein the preset condition is that:
a current transmission time is an SR transmission occasion; or
the current transmission time is an SR transmission occasion, and a plurality of SR configurations are in the SR transmission occasion.

17. A base station, comprising:
a memory, configured to store instructions; and
a processor, configured to read the instructions in the memory to:
receive an information sequence sent by a terminal on a transmission resource of a first physical uplink control channel (PUCCH) format through a transceiver, wherein the information sequence comprises scheduling request (SR) information with M bits and first UCI, and the M is an integer greater than 1;
obtain the SR information with M bits based on the information sequence; and
determine SR states of a plurality of SR configurations configured for the terminal according to the SR information with M bits;
the processor is further configured to:
determine that the SR information with M bits and a first part of CSI are cascaded; and
perform channel decoding on cascaded SR information with M bits and the first part of CSI, and a second part of CSI respectively;
wherein the first UCI comprises the CSI and the CSI consists of the first part of CSI and the second part of CSI.

18. The base station according to claim 17, wherein the SR information with M bits is determined according to one of the following mode:
mode 1:
the SR information with M bits corresponds to a plurality of SR configurations, one bit of the M bits corresponds to one SR configuration of the plurality of SR configurations, and a value of the one bit indicates that the one SR configuration is in a positive SR state or a negative SR state;
mode 2:
a first bit state of a plurality of bit states corresponding to the SR information with M bits indicates that each of the plurality of SR configurations is in a negative SR state, and A bit states of the plurality of bit states other than the first bit state of the plurality of bit states correspond to SR states of A SR configurations, wherein one bit state of the A bit states indicates that one SR configuration of the A SR configurations is in a positive SR state, and the first bit state is any one of the plurality of bit states.

19. The base station according to claim 18, wherein in the condition that the mode 1 is used, the mode 1 comprises at least one of the mode 1-1, mode 1-2, or mode 1-3:
the mode 1-1:
the value of M is determined by one of the following:
the M is a maximum quantity of a plurality of SR configurations supported in system configured for the terminal;
the M is a quantity of the plurality of SR configurations configured for the terminal;
the M is a quantity of SR configurations with overlapping transmission occasions within the plurality of SR configurations configured for the terminal;
a value of the M is notified to the terminal by a network side through configuration signaling;
the mode 1-2:
the SR information with M bits corresponding to a plurality of SR configurations comprises one of the following:
the SR information with M bits corresponds to the plurality of SR configurations based on a preset order of the plurality of SR configurations;
the SR information with M bits corresponds to the plurality of SR configurations based on a corresponding relationship notified by a network layer;
the mode 1-3:
only one bit of the M bits indicates the positive SR state;
in the condition that the mode 2 is used, the mode 2 further comprises at least one of mode 2-1 or mode 2-2:
the mode 2-1:
the plurality of bit states further comprise reserved states in the condition that a quantity of states of the plurality of bit states is greater than or is equal to a quantity of the plurality of SR configurations plus 1;
the mode 2-2:
the value of M is determined by one of the following:
the M is determined according to a maximum quantity A1 of a plurality of SR configurations supported in system configured for the terminal, wherein the M is determined through a formula: M=ceil ($\log_2$(A1+1)), and ceil means rounding up;
the M is determined according to a quantity A2 of the plurality of SR configurations configured for the terminal, wherein the M is determined through a formula: M=ceil ($\log_2$(A2+1)), and ceil means rounding up;
the M is determined according to a quantity A3 of SR configurations with overlapping transmission occasions within the plurality of SR configurations configured for the terminal, wherein the M is determined through a formula: M=ceil ($\log_2$(A3+1)), and ceil means rounding up; or
a value of the M is notified to the terminal by a network side through configuration signaling.

20. The base station according to claim 17, wherein the first PUCCH format is PUCCH format 2 or PUCCH format 3 or PUCCH format 4 or a PUCCH format for carrying more than 2 bits of the first UCI.

* * * * *